(12) United States Patent
Niu et al.

(10) Patent No.: US 12,192,467 B1
(45) Date of Patent: Jan. 7, 2025

(54) ARITHMETIC ENCODING AND DECODING METHOD BASED ON SEMANTIC SOURCE AND RELATED DEVICE

(71) Applicant: Beijing University of Posts and Telecommunications, Beijing (CN)

(72) Inventors: Kai Niu, Beijing (CN); Zijian Liang, Beijing (CN); Jin Xu, Beijing (CN); Ping Zhang, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 18/895,959

(22) Filed: Sep. 25, 2024

(30) Foreign Application Priority Data

Jan. 22, 2024 (CN) .......................... 202410090179.8

(51) Int. Cl.
*H04N 19/13* (2014.01)
*H04N 19/70* (2014.01)
*H04N 19/91* (2014.01)

(52) U.S. Cl.
CPC ............. *H04N 19/13* (2014.11); *H04N 19/70* (2014.11); *H04N 19/91* (2014.11)

(58) Field of Classification Search
CPC ......... H04N 19/13; H04N 19/70; H04N 19/91
See application file for complete search history.

(56) References Cited

U.S. PATENT DOCUMENTS

| 2004/0008130 A1* | 1/2004 | Yang ................... | H03M 7/4006 341/51 |
| 2021/0028794 A1* | 1/2021 | Marpe ................. | H03M 7/4037 |

* cited by examiner

*Primary Examiner* — Fabio S Lima
(74) *Attorney, Agent, or Firm* — Westbridge IP LLC (57) ABSTRACT

Disclosed is an arithmetic encoding method based on a semantic source, which is applied to an encoder. In this method, a preset encoding interval of the semantic source and a syntax symbol sequence containing syntax symbols are obtained. For each syntax symbol of the syntax symbols, a target synonymous subset of the syntax symbol is determined from preset synonymous subsets of the syntax symbol. The target synonymous subset of the syntax symbol is encoded according to the preset encoding interval through an arithmetic encoding algorithm to obtain an encoded result sequence corresponding to the syntax symbol sequence. After obtaining a sequence length of the syntax symbol sequence, the sequence length and the encoded result sequence are sent to a decoder for decoding.

8 Claims, 4 Drawing Sheets

FIG. 6 ated result sequence to a decoder for decoding the encoded result sequence based on the sequence length to obtain a reconstructed syntax symbol sequence.

ARITHMETIC ENCODING AND DECODING METHOD BASED ON SEMANTIC SOURCE AND RELATED DEVICE

CROSS-REFERENCE TO RELATED APPLICATIONS

This application claims priority to Chinese Patent Application No. 202410090179.8, filed on Jan. 22, 2024, the content of which is incorporated herein by reference in its entirety.

TECHNICAL FIELD

The present application relates to encoding and decoding technology, in particular to an arithmetic encoding and decoding method based on a semantic source and related devices.

BACKGROUND

Source coding is an important component which ensures an effectiveness of a communication system. Arithmetic coding is a commonly used and important coding method in lossless source coding. When a sequence is long enough, arithmetic coding can make an efficiency of a compression coding approach a limit of lossless source compression in the classical Shannon information theory. In existing arithmetic coding schemes, if only semantic information is guaranteed not to be distorted, the compression efficiency may be relatively low. Therefore, how to improve a compression efficiency while ensuring that the semantic information is not distorted has become an important research hotspot.

SUMMARY

In view of the above, examples of the present disclosure provide an arithmetic encoding and decoding method based on a semantic source and related devices which can improve a compression efficiency while ensuring that semantic information is not distorted.

In examples of the present disclosure, the arithmetic encoding method based on a semantic source, which is applied to an encoder, may include: obtaining a preset encoding interval of the semantic source and a syntax symbol sequence to be encoded; where, the syntax symbol sequence to be encoded contains at least one syntax symbol; for each syntax symbol of the at least one syntax symbol, determining a target synonymous subset from preset synonymous subsets of the syntax symbol; for each syntax symbol of the at least one syntax symbol, encoding the target synonymous subset corresponding to the syntax symbol according to the preset encoding interval by an arithmetic encoding algorithm to obtain an encoded result sequence corresponding to the syntax symbol sequence to be encoded; obtaining a sequence length of the syntax symbol sequence to be encoded; sending the sequence length and the encoded result sequence to a decoder for decoding the encoded result sequence based on the sequence length to obtain a reconstructed syntax symbol sequence.

In examples of the present disclosure, the arithmetic decoding method based on a semantic source, which is applied to a decoder, may include: receiving a sequence length and an encoded result sequence sent by an encoder; obtaining a preset decoding interval and preset syntax symbols of the semantic source; decoding the encoded result sequence to obtain reconstructed synonymous subsets according to the preset decoding interval by an arithmetic decoding algorithm; where, the number of the reconstructed synonymous subsets is the same as the sequence length; for each reconstructed synonymous subset, determining semantic information corresponding to the reconstructed synonymous subset, and selecting a target reconstructed syntax symbol corresponding to the reconstructed synonymous subset from the preset syntax symbols based on the semantic information; arranging the target reconstructed syntax symbols corresponding to the reconstructed synonymous subsets to obtain a sequence of reconstructed syntax symbols.

In examples of the present disclosure, an arithmetic encoding device based on a semantic source is also disclosed. The arithmetic encoding device is applied to an encoder, which may include the following modules.

A data obtaining module, configured to obtain a preset encoding interval of the semantic source and a syntax symbol sequence to be encoded; where, the syntax symbol sequence to be encoded contains at least one syntax symbol.

A target synonymous subset determination module, configured to for each syntax symbol of the at least one syntax symbol, determine a target synonymous subset from preset synonymous subsets of the syntax symbol.

An encoded result sequence determination module, configured to for each syntax symbol of the at least one syntax symbol, encode the target synonymous subset corresponding to the syntax symbol according to the preset encoding interval by an arithmetic encoding algorithm to obtain an encoded result sequence corresponding to the syntax symbol sequence to be encoded.

A data transmitting module, configured to obtain a sequence length of the syntax symbol sequence to be encoded and send the sequence length and the encoded result sequence to a decoder for decoding the encoded result sequence based on the sequence length to obtain a reconstructed syntax symbol sequence.

In examples of the present disclosure, an arithmetic decoding device based on a semantic source is also disclosed. The arithmetic decoding device is applied to a decoder, which may include the following modules.

An encoded result sequence receiving module, configured to receive a sequence length and an encoded result sequence sent by an encoder, and obtain a preset decoding interval and preset syntax symbols of the semantic source.

A reconstructed synonymous subset determination module, configured to decode the encoded result sequence according to the preset decoding interval by an arithmetic decoding algorithm to obtain reconstructed synonymous subsets; where, the number of the reconstructed synonymous subsets equals to the sequence length.

A target reconstructed syntax symbol determination module, configured to for each reconstructed synonymous subset, determine semantic information corresponding to the reconstructed synonymous subset, and select a target reconstructed syntax symbol corresponding to the reconstructed synonymous subset from the preset syntax symbols based on the semantic information.

A reconstructed syntax symbol sequence determination module, configured to arrange the target reconstructed syntax symbols corresponding to the reconstructed synonymous subsets to obtain a sequence of reconstructed syntax symbols.

Examples of the present disclosure also provides an electronic device, which includes: a memory, a processor, and a computer program stored in the memory and executable on the processor. The processor executes the program to implement the arithmetic encoding and decoding method based on a semantic source described above.

Examples of the present disclosure also provide a non-transient computer-readable storage medium which stores computer instructions for causing a computer to execute the arithmetic encoding and decoding method based on a semantic source described above.

From the above, it can be seen that the arithmetic encoding and decoding method based on a semantic source and related devices proposed by the present disclosure may obtain a preset encoding interval of the semantic source and a syntax symbol sequence to be encoded. The syntax symbol sequence to be encoded may contain at least one syntax symbol. For each syntax symbol, a target synonymous subset corresponding to the syntax symbol may be determined. Then, the target synonymous subset corresponding to each syntax symbol may be encoded respectively. Through an arithmetic encoding algorithm and based on the preset coding interval, the target synonymous subsets corresponding to the syntax symbols may be encoded to obtain an encoded result sequence corresponding to the syntax symbol sequence to be encoded. The encoding method may achieve a compression of semantic information during a source compression process. Further, a data compression efficiency may be further improved through the arithmetic encoding algorithm. Later, a sequence length of the syntax symbol sequence to be encoded may be obtained, and the sequence length and the encoded result sequence may be sent to a decoder, so that the decoder can decode the encoded result sequence based on the sequence length to obtain a reconstructed syntax symbol sequence. The arithmetic encoding and decoding method based on a semantic source and related devices disclosed may ensure that the reconstructed syntax symbol sequence has the same semantic information as the syntax symbol sequence to be encoded, which may achieve a distortion free transmission of semantic information.

BRIEF DESCRIPTION OF THE DRAWINGS

In order to describe technical solutions of the present application or related arts more clearly, accompanying drawings required for describing examples or the related art are introduced briefly in the following. Apparently, the accompanying drawings in the following descriptions only illustrate some examples of the present application, and those of ordinary skill in the art may still derive other drawings from these drawings without creative efforts.

DETAILED DESCRIPTION OF THE EMBODIMENTS

Hereinafter, in order to make the objective(s), technical solution(s) and advantages of the present application clearer and more understandable, the present application will be further described in detail, in connection with specific embodiments and with reference to the accompanying drawings.

It is necessary to be noted that the technical terms or scientific terms used in the embodiments of the present application should have common meanings as understood by those skilled in the art of the present application, unless otherwise defined. The "first", "second" and similar words used in the embodiments of the present application do not refer to any sequence, number or importance, but are only used to distinguish different component portions. The "comprise", "include" or a similar word means that an element or item before such word covers an element or item or any equivalent thereof as listed after such word, without excluding other elements or items. The "connect" or "interconnect" or a similar word does not mean being limited to a physical or mechanical connection, but may include a direct or indirect electrical connection. The "upper", "lower", "left" and "right" are used only to indicate a relative position relation, and after the absolute position of the described object is changed, the relative position relation may be changed accordingly.

Figure 1A:
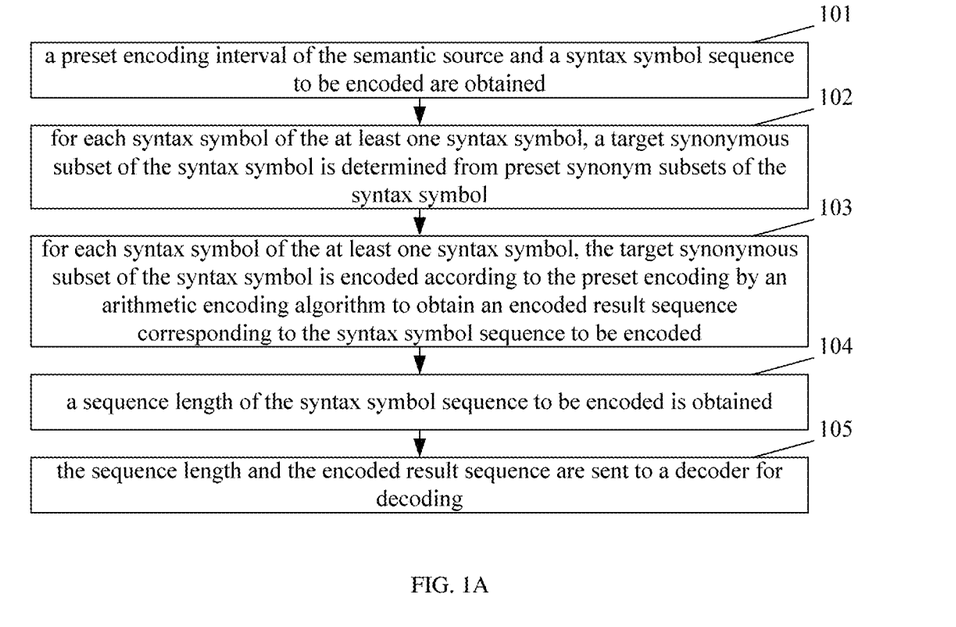
FIG. 1A is a schematic flowchart of the arithmetic encoding method based on a semantic source according to an example of the present disclosure.

Examples of the present disclosure disclose an arithmetic encoding method based on a semantic source applied to an encoder. As shown in FIG. 1A, the arithmetic encoding method may include the following steps.

In step 101, a preset encoding interval of the semantic source and a syntax symbol sequence to be encoded are obtained.

In examples of the present disclosure, the syntax symbol sequence to be encoded contains at least one syntax symbol.

In specific examples, the encoding interval of the semantic source may be initialized. The initialized encoding interval may be used as the preset encoding interval. The preset encoding interval can be regarded as a set of encoding results of source sequences contained by a semantic source.

For example, if the preset encoding interval is [0,1), any source sequence contained by the semantic source can be mapped into a decimal interval in [0,1).

In step 102, for each syntax symbol of the at least one syntax symbol, a target synonymous subset of the syntax symbol is determined from preset synonymous subsets of the syntax symbol.

In specific examples, each syntax symbol may be a syntax symbol contained by the semantic source. Moreover, initial synonymous subsets corresponding to each syntax symbol can be determined in advance. That is, the relationships between the syntax symbols and the initial synonymous subsets can be setup and stored in advance. For each syntax symbol, the target synonymous subset corresponding to the syntax symbol can be determined according to the relationships between the syntax symbols and the initial synonymous subsets stored.

In step 103, for each syntax symbol of the at least one syntax symbol, the target synonymous subset of the syntax symbol is encoded according to the preset encoding by an arithmetic encoding algorithm to obtain an encoded result sequence corresponding to the syntax symbol sequence to be encoded.

The arithmetic encoding algorithm is a commonly used and an important encoding method in lossless source coding. The basic idea of the arithmetic encoding is to divide an encoding interval into sub-intervals based on probabilities of symbols to be encoded, and to select a specific sub-interval as a new encoding interval based on the current symbol to be encoded. Based on recursive partitioning of sub-intervals, the sequence to be encoded may be uniquely mapped to a sub-interval, and a shortest binary sequence that can represent any value in this sub interval may be used as a compression result.

In examples of the present disclosure, the target synonymous subsets corresponding to the syntax symbols may be encoded according to the preset encoding interval through the arithmetic encoding algorithm respectively to obtain the encoded result sequence.

In step 104, a sequence length of the syntax symbol sequence to be encoded is obtained.

In step 105, the sequence length and the encoded result sequence are sent to a decoder for decoding the encoded result sequence based on the sequence length to obtain a reconstructed syntax symbol sequence.

In specific examples, the syntax symbol sequence to be encoded may be traversed to obtain the sequence length of the syntax symbol sequence to be encoded. Then, the sequence length and the encoded result sequence may be sent to the decoder. The decoder may then decode the encoded result sequence to obtain a reconstructed syntax symbol sequence with a length equal to the sequence length. Moreover, the semantic information of the reconstructed syntax symbol sequence is the same as that of the syntax symbol sequence to be encoded.

From the above, it can be seen that the arithmetic encoding and decoding method based on a semantic source and related devices proposed by the present disclosure can obtain a preset encoding interval of the semantic source and a syntax symbol sequence to be encoded. The syntax symbol sequence to be encoded may contain at least one syntax symbol. For each syntax symbol, a target synonymous subset corresponding to the syntax symbol may be determined. Then, the target synonymous subsets corresponding to the syntax symbols may be encoded according to the preset coding interval through an arithmetic encoding algorithm to obtain an encoded result sequence corresponding to the syntax symbol sequence to be encoded. This arithmetic encoding method may achieve a compression of semantic information during a source compression process. Further, a data compression efficiency may be further improved through the arithmetic encoding algorithm. Later, a sequence length of the syntax symbol sequence to be encoded may be obtained. Then, the sequence length and the encoded result sequence may be sent to the decoder, so that the decoder can decode the encoded result sequence based on the sequence length to obtain a reconstructed syntax symbol sequence. The arithmetic encoding and decoding method based on a semantic source and related devices disclosed may ensure that the reconstructed syntax symbol sequence has same semantic information as the syntax symbol sequence to be encoded, which may achieve a distortion free transmission of the semantic information.

In some examples, step 102 may specifically include: for each syntax symbol, obtaining target symbol information of the syntax symbol; selecting an initial synonymous subset from preset initial synonymous subsets associated with the syntax symbol according to the target symbol information as the target synonymous subset corresponding to the syntax symbol.

In specific implementations, each syntax symbol may correspond to the target symbol information, and each syntax symbol may be associated with at least one initial synonymous subset. Moreover, each initial synonymous subset may correspond to a piece of symbol information. In this case, for each syntax symbol, an initial synonymous subset corresponding to the target symbol information may be determined from all associated initial synonymous subsets as the target synonymous subset corresponding to the syntax symbol.

According to examples of the present disclosure, a construction process of the initial synonymous subsets may specifically include the following steps. Firstly, for each syntax symbol, multiple pieces of preset symbol information corresponding to the syntax symbol and semantic information corresponding to each piece of preset symbol information may be determined. Then, the multiple pieces of preset symbol information can be divided based on the semantic information. In this way, pieces of preset symbol information corresponding to the same semantic information can be divided into a same set to obtain at least one initial synonymous subset. Where, the preset symbol information may include the target symbol information.

In specific implementations, each syntax symbol may correspond to multiple pieces of preset symbol information, and each piece of preset symbol information may correspond to one kind of semantic information. The semantic information corresponding to any two preset symbol information may be the same or different. Moreover, the multiple pieces of preset symbol information corresponding to any two syntax symbols may be the same or different.

For each syntax symbol, the multiple pieces of preset symbol information corresponding to the syntax symbol can be divided based on the semantic information, and any pieces of preset symbol information with the same semantic information may be divided into a same set to obtain at least one initial synonymous subset.

The multiple pieces of preset symbol information may include the target symbol information, and the initial synonymous subset corresponding to the target symbol information may be regarded as the target synonymous subset.

For example, assuming a syntax symbol is $u_1$, the multiple pieces of preset symbol information corresponding to $u_1$ is 1, 2, 3, 4, 5, 6, 7, and the target symbol information corresponding to $u_1$ is 3. According to the method disclosed, the preset symbol information can be divided into initial synonymous subsets according to the semantic information. The initial synonymous subsets corresponding to $u_1$ are synonymous subset A, synonymous subset B, and synonymous subset C. The preset symbol information contained in synonymous subset A is 1 and 2, the preset symbol information contained in synonymous subset B is 3 and 4, and the preset symbol information contained in synonymous subset C is 5, 6, and 7. Based on the target symbol information corresponding to $u_1$, synonymous subset B may be selected as the target synonymous subset.

In some examples of the present disclosure, step 103 may specifically include the following process.

Firstly, for each syntax symbol, the probabilities of the multiple pieces of the preset symbol information corresponding to the initial synonymous subsets associated with the syntax symbol are added to obtain the probabilities of the initial synonymous subsets.

Then, a first permutation order of all syntax symbols in the syntax symbol sequence to be encoded may be obtained. Further, a target encoding interval may be selected from the preset encoding interval through an arithmetic encoding algorithm, based on the first permutation order, the target synonymous subsets corresponding to the syntax symbols, and the probabilities of all initial synonymous subsets associated with each syntax symbol.

Finally, a shortest binary sequence may be determined according to the target encoding interval. The shortest binary sequence may be regarded as the encoded result sequence corresponding to the syntax symbol sequence to be encoded.

In specific implementations, for each initial synonymous subset corresponding to each syntax symbol, a calculation process of the probability of the initial synonymous subset may specifically include the following steps.

At first, the preset symbol information corresponding to each initial synonymous subset may be obtained. Then, for each initial synonym, the probability of each preset symbol information may be determined. Further, the number of pieces of the preset symbol information corresponding to each initial synonym may be obtained.

If the number of pieces of the preset symbol information corresponding to an initial synonym is one, the probability of the preset symbol information may be taken as the probability of the initial synonymous subset.

If the number of pieces of the preset symbol information corresponding to an initial synonym is multiple, the probability of each piece of the preset symbol information corresponding to the initial synonymous subset may be added up to obtain the probability of the initial synonymous subset.

For example, if the initial synonymous subset A contains preset symbol information 1, 2, and 3, with corresponding probability of 0.1, 0.2, and 0.1 respectively, the probability of the initial synonymous subset A may be 0.4, which is a sum of 0.1, 0.2 and 0.1.

In some examples, based on correlations, the probability of the initial synonymous subset can also be calculated according to a conditional probability. That is, for a syntax symbol except for the first syntax symbol, the probability of the initial synonymous subsets corresponding to this syntax symbol need to be determined by taking the target synonymous subset of its previous syntax symbols that have already been encoded as a condition. The probabilities of the preset symbol information corresponding to the initial synonymous subset may be added up to obtain the probability of the initial synonymous subset. For example, if the semantic source is a first-order Markov source, the probability of the initial synonymous subset can also be calculated according to a conditional probability. In this case, the probability of the preset symbol information corresponding to an initial synonymous subset needs to consider first-order Markov characteristics. At this time, the probability of the initial synonymous subset may be expressed by the following formula.

$$\begin{cases} p(U_{1,k}) = \sum_{n \in N_{i,k}} p(u_{1,n}), i = 1 \\ p(U_{i,k}|U_{i-1}) = \sum_{n \in N_{i,k}} p(u_{i,n}|U_{i-1}), 1 < i \le m \end{cases}$$

Where, $U_{i-1}$ refers to an encoded synonymous subset, m refers to the number of syntax symbols, i refers to an $i^{th}$ symbol according to the first permutation, $U_{i,k}$ refers to a $k^{th}$ initial synonymous subset corresponding to the $i^{th}$ symbol, $N_{i,k}$ refers to a set of sequence numbers of the preset symbol information in the $k^{th}$ initial synonymous subset corresponding to the $i^{th}$ symbol, and $u_{i,n}$ refers to a probability of the $n^{th}$ preset symbol information of the $i^{th}$ symbol.

In some other examples, the semantic source may be a second-order Markov source, and the calculation is also based on a conditional probability. When calculating the probabilities of the initial synonymous subsets corresponding to a second syntax symbol according to the first permutation, the target synonymous subset corresponding to the first syntax symbol needs to be determined. The probabilities of the multiple pieces of the preset symbol information corresponding to an initial synonymous subset of the second syntax symbol may be determined based on the target synonymous subset corresponding to the first syntax symbol as a condition. The probabilities of the multiple pieces of the preset symbol information corresponding to the initial synonymous subset may be added up to obtain the probability of the initial synonymous subset.

For a syntax symbol except for the first syntax symbol and the second syntax symbol, the probabilities of the initial synonymous subsets corresponding to the syntax symbol needs to be determined. The target synonymous subset corresponding to the first two order syntax symbols are used as conditions to determine the probabilities of the multiple pieces of the preset symbol information corresponding to each initial synonymous subset. The probability of the multiple pieces of the preset symbol information corresponding to each initial synonymous subset may be added up to obtain the probability of the initial synonymous subset.

The probabilities of the multiple pieces of the preset symbol information corresponding to an initial synonymous subset needs to consider the second-order Markov characteristics. In this situation, the probability of the initial synonymous subset may be expressed by the following formula.

$$\begin{cases} p(U_{1,k}) = \sum_{n \in N_{i,k}} p(u_{1,n}), i = 1 \\ p(U_{2,k}|U_1) = \sum_{n \in N_{i,k}} p(u_{2,n}|U_1), i = 2 \\ p(U_{i,k}|U_{i-2}U_{i-1}) = \sum_{n \in N_{i,k}} p(u_{i,n}|U_{i-2}U_{i-1}), 2 < i \le m \end{cases}$$

In some examples, the probability of the initial synonymous subset can be transmitted to the decoder as header information. Alternatively, then encoder and the decoder can synchronize the initial synonymous subsets in a form of pre-agreed prior information to avoid occupying the length of the encoded result sequence which may reduce the compression efficiency. Alternatively, the probability of the initial synonymous subset can be obtained through an adaptive probability estimation. In this case, there is no need to transmit any probability of the initial synonymous subset or to synchronize the information in the form of pre-agreed prior information between the encoder and the decoder. The only requirement is that the same adaptive probability estimation method needs to be adopted at both the encoder and decoder.

In specific implementations, the probability of a pieces of the preset symbol information contained in each initial synonymous subset should be obtained. The method for determining the probability of a piece of the preset symbol information includes at least one of the following: determining the probability through statistical methods, determining the probability through prior probability methods, and determining the probability through table lookup methods.

By way of example, the symbol information and the probability may be associated and stored in advance in a database in a form of a table. In this way, the probability corresponding to the preset symbol information can be retrieved from the database based on the preset symbol information.

Then, the probability of the target synonymous subset may be determined based on the probability of each piece of the preset symbol information contained in the target synonymous subset.

Specifically, the first permutation order of all syntax symbols in the syntax symbol sequence to be encoded may be obtained. Then, the target encoding interval may be selected from the preset encoding interval using an arithmetic encoding algorithm based on the first permutation order, the target synonymous subset corresponding to each syntax symbol, and the probabilities of the initial synonymous subsets associated with each syntax symbol.

Further, the shortest binary sequence of the target encoding interval may be determined, which is the shortest binary encoding sequence that can characterize all the values in the target encoding interval. The shortest binary sequence may be used as the encoded result sequence. The codeword corresponding to the shortest binary sequence is within the target encoding interval.

In some examples, if the preset encoding interval is [0,1), the shortest binary sequence is the binary decimal sequence corresponding to the codeword, which satisfies the following relationship: $c=b_1 \cdot 2^{-1}+b_2 \cdot 2^{-2}+ \ldots b_l \cdot 2^{-l}$; where, $b=(b_1, b_2, \ldots, b_l)$ is the shortest binary sequence; c refers to the codeword; l refers to the length of the shortest binary sequence.

In some examples, the step of obtaining the first permutation order of all syntax symbols in the syntax symbol sequence to be encoded, and selecting the target encoding interval in the preset encoding interval based on the first permutation order, the target synonymous subset corresponding to each syntax symbol, and the probability values of all initial synonymous subsets associated with each syntax symbol through an arithmetic encoding algorithm may specifically include the following steps.

Taking the preset encoding interval as a candidate encoding interval, taking the first syntax symbol in the first permutation order as the target symbol, and performing at least one iteration operation on the preset encoding interval. Where, each iteration operation may be performed as follows.

The candidate encoding interval is divided into at least one initial encoding interval corresponding to the initial synonymous subsets of the target symbol based on the probabilities of the initial synonymous subsets of the target symbol.

Taking the initial encoding interval that corresponds to the target synonymous subset of the target symbol as an updated candidate encoding interval, and taking a next syntax symbol of the target symbol according to the first permutation order as a new target symbol for the next iteration, until there is no next symbol in the syntax symbol sequence. Exit the iteration operation, if there is no next symbol in the syntax symbol sequence.

Taking the candidate encoding interval as the target encoding interval after exiting the iteration operation.

Specifically, the process of determining the updated candidate encoding interval may include the following steps.

At first, obtaining the probabilities of all initial synonymous subsets corresponding to the target symbol, where, the sum of probabilities of all initial synonymous subsets corresponding to the target symbol is 1. Then, dividing the candidate encoding intervals into at least one initial encoding interval according to the probabilities of all initial synonymous subsets, where, each initial encoding interval has a one-to-one corresponding relationship with an initial synonymous subset, and each initial encoding interval has a one-to-one corresponding relationship with the probability of an initial synonymous subset. Later, selecting the initial encoding interval corresponding to the target synonymous subset from the at least one initial encoding interval of the target symbol as the updated candidate encoding interval.

For example, the target symbol is $u_1$, and all initial synonymous subsets corresponding to $u_1$ are synonymous subset A, synonymous subset B, and synonymous subset C. The probability of synonymous subset A is 0.2, the probability of synonymous subset B is 0.3, and the probability of synonymous subset C is 0.5. Based on the probabilities of all initial synonymous subsets of the target symbol $u_1$, the candidate encoding interval is divided into three initial encoding intervals. The initial encoding interval corresponding to synonymous subset A occupies 20% of the candidate encoding interval, the initial encoding interval corresponding to synonymous subset B occupies 30% of the candidate encoding interval, and the initial encoding interval corresponding to synonymous subset C occupies 50% of the candidate encoding interval. If the target synonymous subset corresponding to the target symbol is synonymous subset B, the initial encoding interval corresponding to synonymous subset B would be taken as the updated candidate encoding interval.

For example, the preset encoding interval is $[L_0, H_0)$, and the first permutation order is $(u_1, u_2, u_3)$. $u_1$ is taken as the target symbol, and the corresponding interval $[L_1, H_1)$ in $[L_0, H_0)$ is selected as a new updated candidate encoding interval based on the target synonymous subset corresponding to $u_1$. $u_2$ is taken as a next target symbol, and the corresponding interval $[L_2, H_2)$ in $[L_1, H_1)$ is selected as a new updated candidate encoding interval based on the target synonymous subset corresponding to $u_2$. $u_3$ is taken as a next target symbol, and the corresponding interval $[L_3, H_3)$ in $[L_2, H_2)$ is selected as a new updated candidate encoding interval based on the target synonymous subset corresponding to $u_3$. If there is no next target symbol according to the first permutation order, exit the iteration operation and use $[L_3, H_3)$ as the target encoding interval.

Figure 1B:
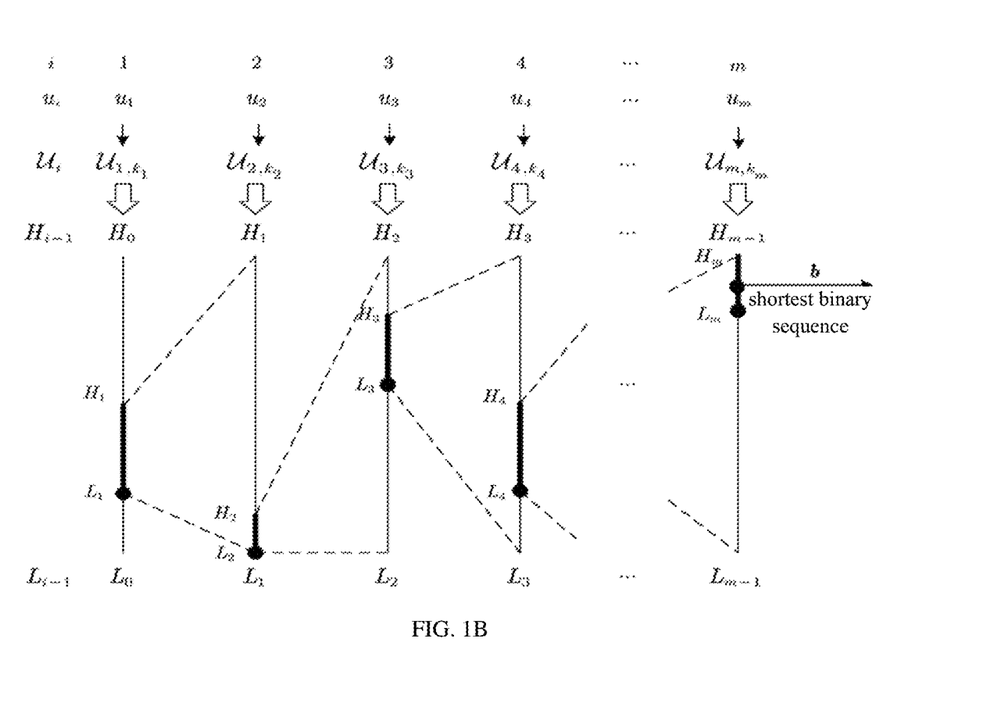
FIG. 1B is a schematic flowchart of selecting an encoding interval according to an example of the present disclosure.

Another example is that the preset encoding interval is $[L_0, H_0)$, the target encoding interval is $[L_m, H_m)$, b is the shortest binary sequence, $u_i$ is the $i^{th}$ syntax symbol, and $u_j$ is the target synonymous subset corresponding to the $i^{th}$ syntax symbol $u_i$. The target synonymous subset corresponding to each sequential syntax symbol may be determined, and the target encoding interval can be selected from the preset encoding interval based on each sequential target synonymous subset through the arithmetic encoding algorithm. The schematic diagram of the selection process is shown in FIG. 1B.

In some examples, after determining an updated candidate encoding interval, to ensure a computational accuracy, the updated candidate encoding interval may be further amplified.

The method for amplifying an updated candidate encoding interval $[L_i, H_i)$ may include: selecting a value s that satisfies $L_i-\varepsilon < s \leq L_i$ and $s < H_i$, and updating the interval $[L_i, H_i)$ to $[\alpha(L_i-s), \alpha(H_i-s))$, where, $\varepsilon$ is a smaller value indicating that the value of s should be close to $L_i$; $\alpha$ is magnification index, which is greater than or equal to 1 and should be a specific value that can make the updated candidate encoding interval conform to the calculation accuracy.

In some examples, step 103 may specifically include the following steps.

Firstly, obtaining a permutation order of all syntax symbols in the syntax symbol sequence to be encoded.

Then, encoding the target synonymous subsets corresponding to the syntax symbols in sequence according to the permutation order based on the arithmetic encoding algorithm and the preset coding interval to obtain the encoded subsequences corresponding to the syntax symbols.

Finally, all the encoded subsequences are integrated in a specified order to obtain the encoded result sequence corresponding to the syntax symbol sequence to be encoded.

In specific implementations, the encoded result sequence does not need to be converted after the encoding is completed. Instead, partial binary subsequences can be gradually output during the encoding process, so that after the encoding process is completed, all binary subsequences can be merged as the complete encoded result sequence.

In some examples, before step 103, the method may further include: determining whether the syntax symbol sequence to be encoded satisfies a first preset condition. Where, the first preset condition mentioned above may include: multiple pieces of the preset symbol information corresponding to any two syntax symbols in the sequence to be encoded are the same, the initial synonymous subsets corresponding to the two syntax symbols are the same, and the probabilities of the initial synonymous subsets corresponding to the two syntax symbols are the same.

If it is determined that the syntax symbol sequence to be encoded satisfies the first preset condition, step 103 may specifically include the following steps.

Firstly, constructing a sequence of target synonymous subsets based on the corresponding target synonymous subsets of each syntax symbol.

Then, encoding the target synonymous subset sequence based on the preset encoding interval through the arithmetic encoding algorithm to obtain the encoded result sequence corresponding to the syntax symbol sequence to be encoded.

In specific implementations, the encoder can also directly encode synonymous subset sequences. When the syntax symbol sequence to be encoded satisfies the first preset condition, a target synonymous subset sequence is constructed based on the target synonymous subset corresponding to each syntax symbol. The target synonymous subset sequence is then encoded through an arithmetic coding algorithm and based on the preset encoding interval to obtain the encoded result sequence corresponding to the syntax symbol sequence to be encoded.

For example, the syntax symbol sequence to be encoded includes syntax symbol A and syntax symbol B. The preset symbol information corresponding to syntax symbol A is 1, 2, and 3, and the preset symbol information corresponding to syntax symbol B is 1, 2, and 3. At this point, the multiple pieces of the preset symbol information corresponding to these two syntax symbols are the same. The initial synonymous subset a corresponding to syntax symbol A contains preset symbol information 1 and 3, the initial synonymous subset b corresponding to syntax symbol A contains preset symbol information 2, the initial synonymous subset a corresponding to syntax symbol B contains preset symbol information 1 and 3, and the initial synonymous subset b corresponding to syntax symbol B contains preset symbol information 2. At this point, these two syntax symbols correspond to the same initial synonymous subsets. The probability of the initial synonymous subset a corresponding to syntax symbol A is 0.3, the probability of the initial synonymous subset b corresponding to syntax symbol A is 0.2, the probability of the initial synonymous subset a corresponding to syntax symbol B is 0.3, and the probability of the initial synonymous subset b corresponding to syntax symbol B is 0.2. At this point, the probabilities of the initial synonymous subsets corresponding to these two syntax symbols are the same.

That is, the syntax symbol sequence to be encoded meets the first preset condition. In this situation, the target synonymous subset corresponding to each syntax symbol may be determined to construct the target synonymous subset sequence. That is, the target synonymous subset corresponding to syntax symbol A is a, and the target synonymous subset corresponding to syntax symbol B is b. Through the arithmetic coding algorithm and based on the preset encoding interval, the target synonymous subset sequence may be encoded to obtain the encoded result sequence corresponding to the syntax symbol sequence to be encoded.

Through the above scheme, for the syntax symbol sequence to be encoded, under the condition that multiple pieces of the preset symbol information corresponding to any two syntax symbols in the syntax symbol sequence to be encoded are the same, the initial synonymous subsets corresponding to the two syntax symbols are the same, and the probabilities of the initial synonymous subset corresponding to the two syntax symbols are the same, the reconstructed syntax symbol sequence and the syntax symbol sequence to be encoded satisfy the semantic distortion free condition. A higher compression efficiency can be obtained compared to the arithmetic coding based on Shannon information theory, and the implementation difficulty of semantic source arithmetic coding algorithm can be further simplified.

Figure 2:
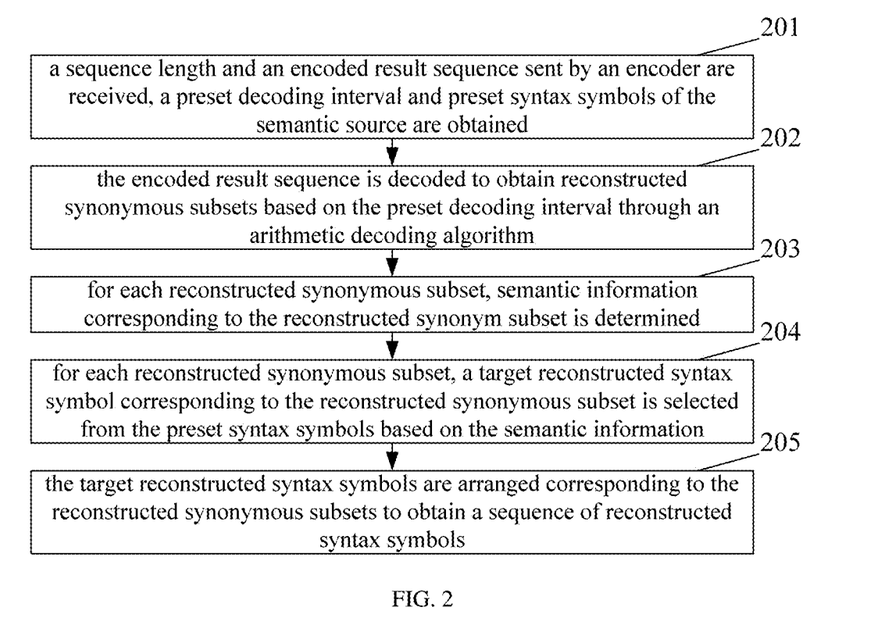
FIG. 2 is a schematic flowchart of the arithmetic decoding method based on a semantic source according to an example of the present disclosure.

Examples of the present disclosure also provides an arithmetic decoding method based on a semantic source, which is applied to a decoder. As shown in FIG. 2, the arithmetic decoding method based on a semantic source may include the following steps.

In step 201, a sequence length and an encoded result sequence sent by an encoder are received. Moreover, a preset decoding interval and preset syntax symbols of the semantic source are obtained.

In specific implementations, the sequence length and encoded result sequence are received from the encoder. Then, the preset syntax symbols and the decoding interval of the semantic source can be determined. Corresponding to the initial encoding interval during the encoding process, the initial decoding interval can be regarded as a set of code words corresponding to any binary sequence to be decoded.

In step 202, the encoded result sequence is decoded to obtain reconstructed synonymous subsets based on the preset decoding interval through an arithmetic decoding algorithm.

In some examples of the present disclosure, the number of reconstructed synonymous subsets mentioned above is the same as the sequence length.

In specific implementations, based on the arithmetic decoding algorithm and the preset decoding interval, the received encoded result sequence can be decoded to obtain at least one reconstructed synonymous subset corresponding to the encoded result sequence. The number of reconstructed synonymous subsets is the same as the sequence length, and the semantic information corresponding to a reconstructed synonymous subset is the same as the semantic information corresponding to a corresponding target synonymous subset during encoding.

In step 203, for each reconstructed synonymous subset, semantic information corresponding to the reconstructed synonymous subset is determined.

In step 204, for each reconstructed synonymous subset, a target reconstructed syntax symbol corresponding to the reconstructed synonymous subset is selected from the preset syntax symbols based on the semantic information.

In specific implementations, for each reconstructed synonymous subset, the semantic information corresponding to the reconstructed synonymous subset can be determined. Moreover, at least one initial reconstructed syntax symbol corresponding to the reconstructed synonymous subset can be selected from the preset syntax symbols based on the semantic information.

In some examples of the present disclosure, the number of initial reconstructed syntax symbols is obtained at first. If the number of initial reconstructed syntax symbols is one, take the initial reconstructed syntax symbol as the target reconstructed syntax symbol. If the number of initial reconstructed syntax symbols is larger than one, any one initial reconstructed syntax symbol can be selected from the initial reconstructed syntax symbols as the target reconstructed syntax symbol, or one initial reconstructed syntax symbol can be selected as the target reconstructed syntax symbol according to a certain rule. Where, the step of selecting an initial reconstructed syntax symbol as the target reconstructed syntax symbol according to a certain rule may include: determining the target reconstructed syntax symbol through a pre-set prior probability, or determining the target reconstructed syntax symbol based on relevant background knowledge of the semantic information corresponding to the reconstructed synonymous subset, or determining the target reconstructed syntax symbol through a trained neural network model, where, the input of the neural network model is the multiple reconstructed synonymous subsets and the output is the target reconstructed syntax symbol.

In step 205, the target reconstructed syntax symbols are arranged corresponding to the reconstructed synonymous subsets to obtain a sequence of reconstructed syntax symbols.

In specific implementations, step 205 may include: obtaining a permutation order of the reconstructed synonymous subsets; determining the target reconstructed syntax symbols corresponding to each reconstructed synonymous subset; and arranging the target reconstructed syntax symbols corresponding to the reconstructed synonymous subsets according to the permutation order of the reconstructed synonymous subsets to obtain the reconstructed syntax symbol sequence.

In some examples of the present disclosure, step 202 may include the following steps.

Firstly, the encoded result sequence may be transformed to obtain a target codeword.

In specific implementations, the encoded result sequence may have a one-to-one corresponding relationship with a codeword in the preset decoding interval, so the encoded result sequence can be converted to obtain the target codeword.

In some examples, when the preset decoding interval is [0,1), the corresponding codeword can be calculated based on the relationship between the encoded result sequence and the codeword.

The relationship between the encoded result sequence and the codeword can be expressed as: $c = b_1 \cdot 2^{-1} + b_2 \cdot 2^{-2} + \ldots b_l \cdot 2^{-l}$.

Then, a reconstructed symbol sequence can be constructed based on the sequence length. To be noted, the number of symbols in the reconstructed symbol sequence may be the same as the sequence length.

Next, a second permutation order of symbols in the reconstructed symbol sequence can be determined.

For each symbol in the reconstructed symbol sequence, at least one initial reconstructed synonymous subset corresponding to the symbol and the probability of each initial reconstructed synonymous subset can be further obtained.

Furthermore, based on the second permutation order, the probability of each initial reconstructed synonymous subset corresponding to each symbol, and the target codeword, the target decoding interval corresponding to each symbol in the preset decoding interval can be determined through an arithmetic decoding algorithm.

Finally, for each symbol, a corresponding reconstructed synonymous subset may be determined based on the target decoding interval and all initial reconstructed synonymous subsets.

In specific implementations, a reconstructed symbol sequence can be constructed based on the sequence length. Specifically, the number of symbols in the reconstructed symbol sequence may be the same as the sequence length. The second permutation order of symbols in the reconstructed symbol sequence can be determined. Further, for each symbol in the reconstructed symbol sequence, at least one initial reconstructed synonymous subset corresponding to the symbol and the probability of each initial reconstructed synonymous subset can be obtained.

The at least one initial reconstructed synonymous subset corresponding to the symbol and the probability of each initial reconstructed synonymous subset can be sent from the encoder to the decoder. In other examples, the at least one initial reconstructed synonymous subset corresponding to the symbol and the probability of each initial reconstructed synonymous subset can also be obtained from pre-agreed prior information, or through an adaptive probability estimation.

Based on the second permutation order and the probability of each initial reconstructed synonymous subset corresponding to each symbol and the target codeword, an arithmetic decoding algorithm can be used to determine the target decoding interval corresponding to each symbol in the preset decoding interval. For each symbol, the corresponding reconstructed synonymous subset can be determined based on the target decoding interval and all initial reconstructed synonymous subsets.

In some examples, the step of using an arithmetic decoding algorithm to determine the target decoding interval corresponding to each symbols from the preset decoding interval based on the second permutation order, the probability of each initial reconstructed synonymous subset corresponding to each symbol, and the target codeword may specifically include the following steps: taking the preset decoding interval as a candidate decoding interval, taking the first symbol in the second permutation order as a target symbol, and performing at least one iteration operation in the preset decoding interval. Where, each iteration operation can be performed as follows.

At first, dividing the candidate decoding interval based on the probability of each initial reconstructed synonymous subset corresponding to the target symbol to obtain at least one initial decoding interval. Where, an initial decoding interval may have a one-to-one corresponding relationship with the probability of an initial reconstructed synonymous subset. That is, the initial decoding interval may have a one-to-one corresponding relationship with the initial reconstruction synonymous subset.

Then, selecting an initial decoding interval containing the target codeword from the at least one initial decoding intervals as the target decoding interval corresponding to the target symbol. Further, taking the target decoding interval as an updated candidate decoding interval, and taking a next symbol of the target symbol as a next target symbol for the next iteration according to the second permutation order. Moreover, in response to determining that there is no next symbol in the target symbol sequence according to the second permutation order, exit the iteration operation.

In this way, the target decoding interval corresponding to each symbol can be obtained one by one.

For example, assuming that the initial decoding interval is $[L_0, H_0)$, and the second permutation order is $(u_1, u_2)$. Take $u_1$ as the target symbol. Initial reconstructed synonymous subsets corresponding to $u_1$ can be obtained as reconstructed synonymous subset A, reconstructed synonymous subset B, and reconstructed synonymous subset C. Then, the probability of each initial reconstructed synonymous subset corresponding to $u_1$ is obtained. That is, the probability of reconstructed synonymous subset A is 0.2, the probability of reconstructed synonymous subset B is 0.6, and the probability of reconstructed synonymous subset C is 0.2. Further, $[L_0, H_0)$ is divided to obtain three initial decoding intervals. The initial decoding interval containing the target codeword may be determined as the initial decoding interval, which is reconstructed synonymous subset B. Then, take the initial decoding interval corresponding to synonymous subset B as the updated candidate decoding interval $[L_1, H_1)$.

Take $u_2$ as the target symbol. Initial reconstructed synonymous subsets corresponding to $u_2$ can be obtained as reconstructed synonymous subset D and reconstructed synonymous subset E. Then, the probability of each initial reconstructed synonymous subset corresponding to $u_2$ can be obtained. That is, the probability of reconstructed synonymous subset D is 0.1 and the probability of reconstructed synonymous subset E is 0.9. Further, $[L_1, H_1)$ is divided to obtain two initial decoding intervals, and the initial decoding interval containing the target codeword may be determined as the initial decoding interval, which is reconstructed synonymous subset E. Then, take the initial decoding interval corresponding to reconstructed synonymous subset E as the updated candidate decoding interval $[L_2, H_2)$. If there is no next symbol of the target symbol $u_2$, exit the iteration operation, and select $[L_2, H_2)$ is used as the target decoding interval.

In some examples, before step 102, the method may further include: determining whether the preset syntax symbol satisfies a second preset condition. Where, the second preset condition mentioned above is that multiple pieces of preset symbol information of two preset syntax symbols are the same, the division methods of the initial synonymous subsets corresponding to the two preset syntax symbols are the same, and the probabilities of the initial synonymous subsets corresponding to the two preset syntax symbols are the same.

In response to determining that the preset syntax symbols satisfy the second preset condition, step 202 may include: decoding the encoded result sequence according to the preset decoding interval through an arithmetic decoding algorithm to obtain a reconstructed synonymous subset sequence. Where, the reconstructed synonymous subset sequence contains multiple reconstructed synonymous subsets.

In specific implementations, in response to determining that multiple pieces of preset symbol information of two preset syntax symbols are the same, the division methods of the initial synonymous subsets corresponding to the two preset syntax symbols are the same, and the probabilities of the initial synonymous subsets corresponding to the two preset syntax symbols are the same, the encoded result sequence may be decoded directly according to the preset decoding interval through the arithmetic decoding algorithm to obtain the reconstructed synonymous subset sequence.

In some examples, before step 205, the method may further include: normalizing each candidate decoding interval and normalizing the target codeword. Subsequently, the normalized candidate decoding intervals may be divided into at least one initial decoding interval based on the probability of each initial reconstructed synonymous subset corresponding to the target symbol. Then, the initial decoding interval containing the normalized target codeword can be selected from the multiple initial decoding intervals as the target decoding interval corresponding to the target symbol. Through the above scheme, by normalizing the candidate decoding intervals, problems such as decoding errors caused by excessive recursive depth and insufficient computational accuracy of the candidate decoding intervals can be avoided.

Based on a same inventive concept, another example of the present disclosure shows an arithmetic encoding and decoding result of an edge texture map source of a natural image, which may specifically include the following procedure.

To be noted, in this example, edge texture maps of natural images taken as the semantic source come from a publicly available dataset BIPEDv2d. Each edge texture map is a 01 black and white image with a resolution of 720*1280, where black represents a non-edge texture part (object and background) in the image with a value of 0, and white represents an edge texture part (boundary between object and object, object and background) in the image with a value of 1.

Figure 3A:
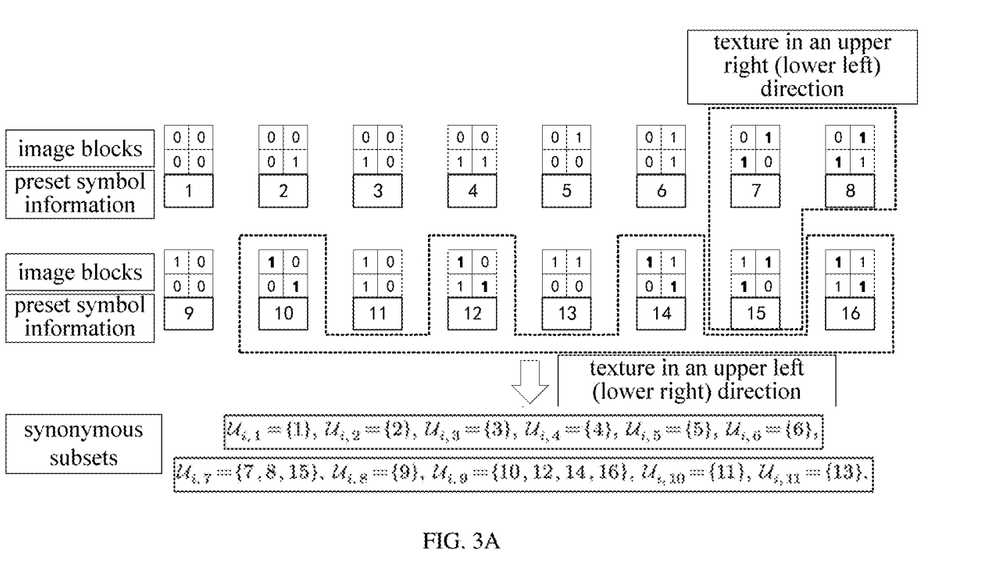
FIG. 3A is a schematic diagram of dividing synonymous subsets according to an example of the present disclosure.

To achieve a distortion free compression of the semantic source, in this example, non-overlapping 2*2 image blocks are used as syntax symbols. Each syntax symbol may correspond to 16 preset symbol information with a value range of 1, 2, 3, . . . , 16. Where, each preset symbol information corresponds to a type of a 2*2 image block. During the encoding process, all the syntax symbols satisfy the condition of having the same possible value range, having the same synonymous mapping method, and having the same probabilities of the synonymous subsets. The synonymous subsets obtained by partitioning based on semantic information are shown in FIG. 3A. According to the texture of the image block (i.e. semantic information), the 16 preset symbol information can be divided into 11 synonymous subsets, where one synonymous subset $U_{i,7}=\{7, 8, 15\}$ represents texture in an upper right (lower left) direction, containing 3 preset symbol information, a synonymous subset $U_{i,9}=\{10, 12, 14, 16\}$ represents texture in an upper left (lower right) direction, containing 4 preset symbol information, and the other synonymous subsets each contain 1 preset symbol information. In the decoding process, a random selection method may be used to randomly select a preset symbol information from the synonymous subset for output.

Figure 3B:
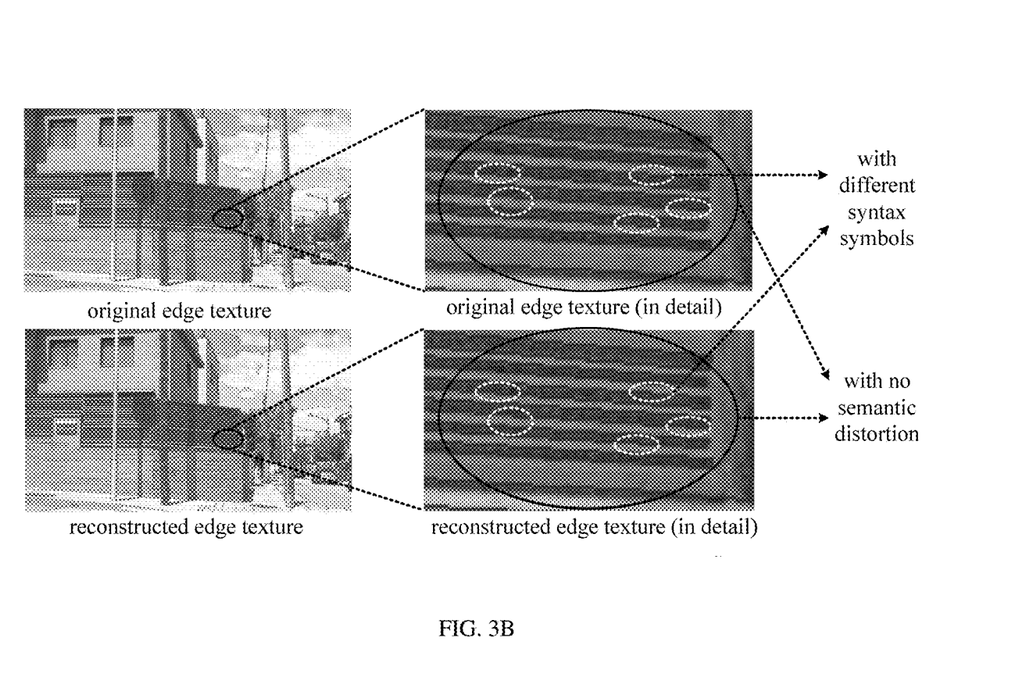
FIG. 3B is a schematic diagram of an original edge texture and a reconstructed edge texture according to an example of the present disclosure.

FIG. 3B shows a comparison between an original edge texture and a reconstructed edge texture corresponding to an example of the present disclosure. Where, both the original edge texture and the reconstructed edge texture are highlighted with dark borders in the original image to present the semantic accuracy of the reconstructed edge texture.

As shown in FIG. 3B, it can be calculated that when using a standard arithmetic encoding algorithm, the edge texture in this example can be compressed to 205990 bits. However, when using the arithmetic encoding method based on a semantic source disclosed in examples of the present disclosure, the edge texture map can be compressed to 204003 bits, which saves 1987 bits.

It should be noted that the method according to examples of the present disclosure may be performed by a single device, such as a computer or server. Moreover, the method according to examples of the present disclosure can also be applied to a distributed scenario, where the method can be implemented through cooperation of multiple devices. In the case of such a distributed scenario, one device of the plurality of devices may only perform one or more steps of the method, and the plurality of devices may interact with each other to perform the described method.

It is noted that some examples of the present disclosure have been described above. Other examples are within the scope of the following claims. In some cases, the acts or steps recited in the claims may be performed in a different order than in the examples described above and can still achieve desirable results. Additionally, the processes depicted in the accompanying drawings do not necessarily require the particular order shown, or sequential order, to achieve desirable results. In some examples, multi-tasking and parallel processing are also possible or may be advantageous.

Based on a same inventive concept and corresponding to any of the above examples, examples of the present disclosure also provide an arithmetic encoding device based on semantic sources.

Figure 4:
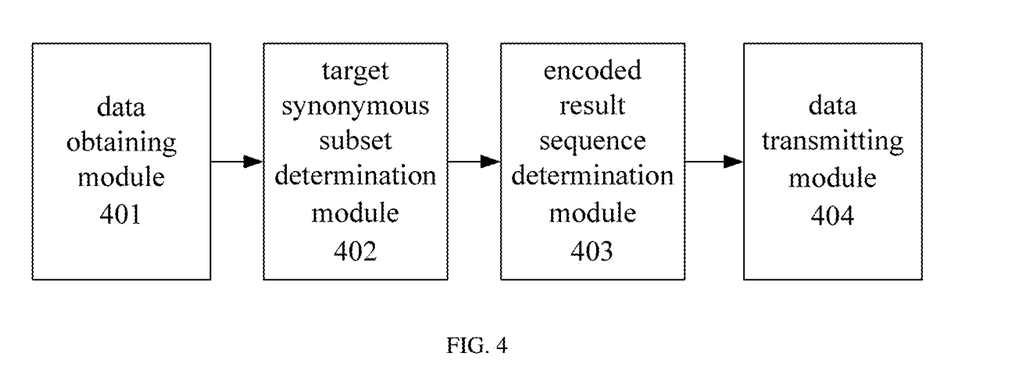
FIG. 4 is a structural block diagram of an arithmetic encoding device based on a semantic source according to an example of the present disclosure.

FIG. 4 is a structural block diagram of the arithmetic encoding device based on a semantic source according to an example of the present disclosure. The arithmetic encoding device is applied to an encoder. As shown in FIG. 4, the arithmetic encoding device may include the following modules.

A data obtaining module 401, configured to obtain a preset encoding interval of the semantic source and a syntax symbol sequence to be encoded; where, the syntax symbol sequence to be encoded contains at least one syntax symbol.

A target synonymous subset determination module 402, configured to determine a target synonymous subset from preset synonymous subsets for each syntax symbol of the at least one syntax symbol.

An encoded result sequence determination module 403, configured to encode the target synonymous subset corresponding to each syntax symbol of the at least one syntax symbol by an arithmetic coding algorithm and the preset encoding interval to obtain an encoded result sequence corresponding to the syntax symbol sequence to be encoded.

A data transmitting module 404, configured to obtain a sequence length of the syntax symbol sequence to be encoded and send the sequence length and the encoded result sequence to a decoder for decoding the encoded result sequence based on the length to obtain a reconstructed syntax symbol sequence.

In examples of the present disclosure, the target synonymous subset determination module 402 is configured to obtain target symbol information of the syntax symbol; and select an initial synonymous subset corresponding to the target symbol information from preset initial synonymous subsets associated with the syntax symbol as the target synonymous subset corresponding to the syntax symbol.

Where, a construction process of the initial synonymous subsets may specifically include the following steps. Firstly, for each syntax symbol, multiple pieces of preset symbol information corresponding to the syntax symbol and semantic information corresponding to each piece of preset symbol information may be determined. Then, the multiple pieces of the preset symbol information can be divided based on the semantic information. In this way, preset symbol information corresponding to same semantic information can be divided into a same set to obtain at least one initial synonymous subset. Where, the preset symbol information may include the target symbol information.

In examples of the present disclosure, the encoded result sequence determination module 403 may include the following units.

A probability determination unit, configured to for each syntax symbol, add the probabilities of the multiple pieces of the preset symbol information corresponding to the initial synonymous subsets associated with the syntax symbol to obtain the probabilities of the initial synonymous subsets.

A target encoding interval determination unit, configured to obtain a first permutation order of all syntax symbols in the syntax symbol sequence to be encoded, select a target encoding interval from the preset encoding interval through an arithmetic encoding algorithm, based on the first permutation order, the target synonymous subsets corresponding to the syntax symbols, and the probabilities of all initial synonymous subsets associated with each syntax symbol.

An encoded result sequence determination unit, configured to determine a shortest binary sequence according to the target encoding interval and take the shortest binary sequence as the encoded result sequence corresponding to the syntax symbol sequence to be encoded.

According to some examples of the present disclosure, the target encoding interval determination unit may be specifically configured to: take the preset encoding interval as a candidate encoding interval, take the first syntax symbol in the first permutation order as the target symbol, and perform at least one iteration operation on the preset encoding interval. Where, each iteration operation may be performed as follows.

Dividing the candidate encoding interval into at least one initial encoding interval corresponding to the initial synonymous subsets of the target symbol based on the probabilities of the initial synonymous subsets of the target symbol.

Taking the initial encoding interval that corresponds to the target synonymous subset of the target symbol as an updated candidate encoding interval, and taking a next syntax symbol of the target symbol according to the first permutation order as a new target symbol for the next iteration, until there is no next symbol in the syntax symbol sequence.

Exiting the iteration operation, if there is no next symbol in the syntax symbol sequence.

Taking the candidate encoding interval as the target encoding interval after exiting the iteration operation.

In some examples, the device may further include a judgement module, configured to determine whether the syntax symbol sequence to be encoded satisfies a first preset condition. Where, the first preset condition mentioned above may include: multiple pieces of the preset symbol information corresponding to any two syntax symbols in the sequence to be encoded are the same, the initial synonymous subsets corresponding to the two syntax symbols are the same, and the probabilities of the initial synonymous subsets corresponding to the two syntax symbols are the same.

If it is determined that the syntax symbol sequence to be encoded satisfies the first preset condition, the encoded result sequence determination module may be specifically configured to construct a sequence of target synonymous subsets based on the corresponding target synonymous subsets of each syntax symbol and encode the target synonymous subset sequence based on the preset encoding interval through the arithmetic encoding algorithm to obtain the encoded result sequence corresponding to the syntax symbol sequence to be encoded.

Based on a same inventive concept and corresponding to any of the above examples, examples of the present disclosure also provide an arithmetic decoding device based on semantic sources.

Figure 5:
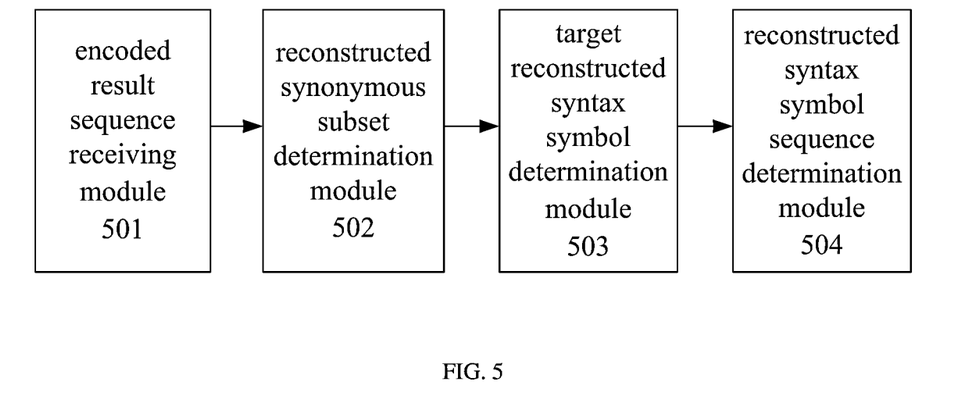
FIG. 5 is a structural block diagram of an arithmetic decoding device based on a semantic source according to an example of the present disclosure.

FIG. 5 is a structural block diagram of an arithmetic decoding device based on a semantic source according to an example of the present disclosure. The arithmetic decoding device is applied in a decoder. As shown in FIG. 5, the arithmetic decoding device may include the following modules.

An encoded result sequence receiving module 501, configured to receive a sequence length and an encoded result sequence sent by an encoder and obtain a preset decoding interval and preset syntax symbols of the semantic source.

A reconstructed synonymous subset determination module 502, configured to decode the encoded result sequence to obtain reconstructed synonymous subsets using an arithmetic decoding algorithm and the preset decoding interval; where, the number of the reconstructed synonymous subsets is the same as the sequence length.

A target reconstructed syntax symbol determination module 503, configured to for each reconstructed synonymous subset, determine semantic information corresponding to the reconstructed synonymous subset, and select a target reconstructed syntax symbol corresponding to the reconstructed synonymous subset from the preset syntax symbols based on the semantic information.

A reconstructed syntax symbol sequence determination module 504, configured to arrange the target reconstructed syntax symbols corresponding to the reconstructed synonymous subsets to obtain a sequence of reconstructed syntax symbols.

According to some examples of the present disclosure, the reconstructed synonymous subset determination module 502 may include the following units.

A target codeword determination unit, configured to transform the encoded result sequence to obtain a target codeword.

A reconstructed symbol sequence construction unit, configured to construct a reconstructed symbol sequence based on the sequence length. To be noted, the number of symbols in the reconstructed symbol sequence may be the same as the sequence length.

An order determination unit, configure to determine a second permutation order of symbols in the reconstructed symbol sequence.

A probability determination unit, configured to for each symbol in the reconstructed symbol sequence, obtain at least one initial reconstructed synonymous subset corresponding to the symbol and the probability of each initial reconstructed synonymous subset.

A target decoding interval determination unit, configured to determine the target decoding interval corresponding to each symbol in the preset decoding interval through an arithmetic decoding algorithm, based on the second permutation order, the probability of each initial reconstructed synonymous subset corresponding to each symbol and the target codeword.

A reconstructed synonymous subset determination unit, configured to for each symbol, a determine a corresponding reconstructed synonymous subset based on the target decoding interval and all initial reconstructed synonymous subsets.

In some examples, the target decoding interval determination unit may be specifically configured to take the preset decoding interval as a candidate decoding interval, take the first symbol in the second permutation order as a target symbol, and perform at least one iteration operation in the preset decoding interval. Where, each iteration operation can be performed as follows.

At first, dividing the candidate decoding interval based on the probability of each initial reconstructed synonymous subset corresponding to the target symbol to obtain at least one initial decoding interval. Where, an initial decoding interval may have a one-to-one corresponding relationship with the probability of an initial reconstructed synonymous subset. That is, the initial decoding interval may have a one-to-one corresponding relationship with the initial reconstruction synonymous subset.

Then, selecting an initial decoding interval containing the target codeword from the at least one initial decoding intervals as the target decoding interval corresponding to the target symbol. Further, taking the target decoding interval as an updated candidate decoding interval, and taking a next symbol of the target symbol as a next target symbol for the next iteration according to the second permutation order.

Exiting the iteration operation, in response to determining that there is no next symbol in the target symbol sequence according to the second permutation order.

Moreover, obtaining the target decoding interval corresponding to each symbol.

In some examples, the device may further include a judgement module, configured to further include: determining whether the preset syntax symbol satisfies a second preset condition. Where, the second preset condition is that multiple pieces of preset symbol information of two preset syntax symbols are the same, the division methods of the initial synonymous subsets corresponding to the two preset syntax symbols are the same, and the probabilities of the initial synonymous subsets corresponding to the two preset syntax symbols are the same.

In response to determining that the preset syntax symbols satisfy the second preset condition, the reconstructed synonymous subset determination module may be specifically configured to decode the encoded result sequence according to the preset decoding interval through an arithmetic decoding algorithm to obtain a reconstructed synonymous subset sequence. Where, the reconstructed synonymous subset sequence contains multiple reconstructed synonymous subsets.

Examples of the present disclosure also provides an electronic device, which includes a memory, a processor, and a computer program stored in the memory and executable on the processor, the processor executes the program to implement the arithmetic encoding and decoding method based on a semantic source.

Figure 6:
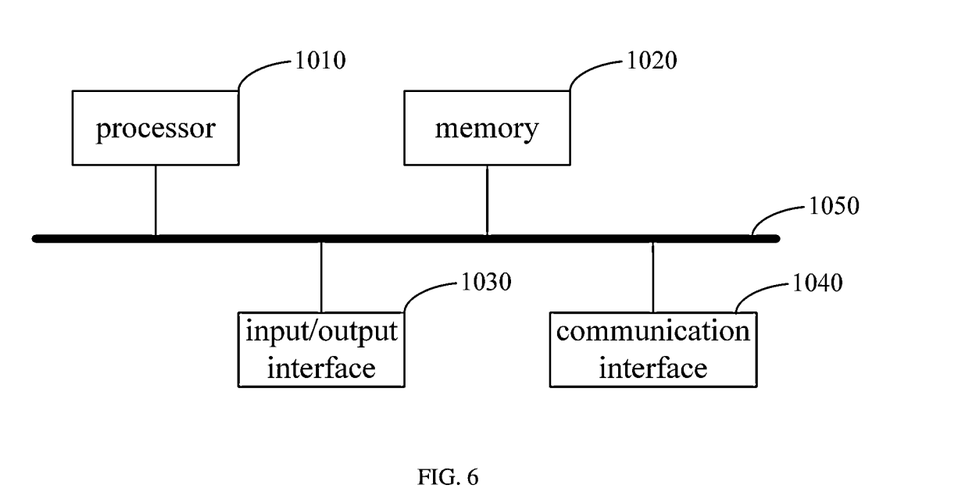
FIG. 6 is a structural block diagram of an electronic device according to an example of the present disclosure.

FIG. 6 is a schematic diagram illustrating a structure of an electronic device according to some examples of the present disclosure. As shown in FIG. 7, the electronic device may include: a processor 1010, a memory 1020, an input/output interface 1030, a communication interface 1040, and a bus 1050. The processor 1010, the memory 1020, the input/ output interface 1030, and the communication interface 1040 may couple to each other via the bus 1050.

The processor 1010 may execute the relevant procedures by virtue of a general central processing unit (CPU), a microprocessor, an application specific integrated circuit (ASIC), or one or more integrated circuits, so as to implement the technical solution provided by the examples of the description.

The memory 1020 may be implemented by a read only memory (ROM), a random-access memory (RAM), a static memory device and a dynamic memory device, etc. The memory 1020 may store an operating system and other application procedures. When the technical solution provided by the example of the description is implemented via the software or the hardware, the related procedure codes are stored in the memory 1020 and revoked by the processor 1010.

The I/O interface 1030 is used for connecting an I/O unit to realize information input and output. The I/O unit may be configured in the device (not in the figure) as a component configuration, and may be externally connected to the device to provide the corresponding functions. The input device may include keyboard, mouse, touch screen, microphone and various sensors. The output device may include display, loudspeaker, vibrator and indicator lamp.

A communication interface 1040 is used for connecting a communication unit (not shown in the figure) to realize communication interaction between the device and other devices. The communication unit may realize communication in a wired manner (for example, USB, wire, etc.) or in a wireless manner (for example, mobile network, WIFI, Bluetooth, etc.).

The bus 1050 includes a passage which transmits information among various components (for example, the processor 1010, the memory 1020, the I/O interface 1030 and the communication interface 1040) on the device.

It should be noted that, although the above-mentioned device merely shows the processor 1010, the memory 1020, the I/O interface 1030, the communication interface 1040 and the bus 1050, the device may further include other components required by the normal operation in the specific implementation process. Besides, those skilled in the art could appreciate that the above-mentioned device may merely include the components required by the solution in the examples of the Description, but not necessarily include all components shown in the figure.

The above-mentioned device of the present disclosure is used to realize the arithmetic encoding and decoding method based on a semantic source in accordance with any of the above examples, and has the beneficial effects of the corresponding method, which will not be repeated here.

Based on a same inventive concept, examples of the present disclosure also provide a non-transitory computer-readable storage medium, which stores a computer instruction. The computer instruction is used to make a computer execute the arithmetic encoding and decoding method based on a semantic source in accordance with any of the above examples.

The computer-readable storage medium in the example includes volatile, non-volatile, movable and non-movable media, which can realize information storage by any method or technology. The information can be computer readable instruction, data structure, program unit or other data. The example of computer storage media includes, but not limited to phase-change memory (PRAM), static random access memory (SRAM), dynamic random access memory (DRAM), other types of random access memory (RAM), read only memory (ROM), electrically erasable programmable read-only memory (EEPROM), flash memory or other memory technologies, compact disk read only memory (CD-ROM), digital versatile disc (DVD) or other optical memories, cassette magnetic tape, tape, disk memory or other magnetic memory device or any other non-transmission media, and available for storing information accessible by the computing devices.

Based on a same inventive concept of the arithmetic encoding and decoding method based on a semantic source described in any of the above examples, the present disclosure also provides a computer program, which includes computer instructions. In some examples, the computer instructions may be executed by one or more processors of a computer to enable the computer and/or processor to execute the arithmetic encoding and decoding method based on a semantic source. Corresponding to the execution subject of each step in examples of the arithmetic encoding and decoding method based on a semantic source, the processor executing the corresponding step can belong to the corresponding execution subject.

The computer program of the above example is used to enable the computer and/or processor to execute an arithmetic encoding and decoding method based on a semantic source as described in any one of the above examples, and has the beneficial effects of corresponding methods, which will not be repeated here.

Those of ordinary skill in the art should appreciate that the discussion on any one of the foregoing examples is merely exemplary, but is not intended to imply that the scope of the present disclosure (including the claims) is limited to these examples. Under the idea of the present disclosure, the technical features of the foregoing examples or different examples may be combined, the steps may be implemented in any order, and there are many other variations in different aspects of the examples of the present disclosure, all of which are not provided in detail for simplicity.

Besides, for the sake of simplifying description and discussion and not making the examples of the present disclosure difficult to understand, the provided drawings may show or not show the public power supply/earthing connection to an integrated circuit (IC) chip and other parts. Besides, the device may be shown in block diagram form to prevent the examples of the present disclosure from being difficult, and moreover, this considers the following facts, that is, the details of the implementations with regard to the devices in these block diagrams highly depend on the platform which will implement the examples of the present disclosure (that is, these details should be completely within the scope understood by those skilled in the art). Where specific details (e.g. circuits) are set forth in order to describe exemplary examples of the present disclosure, it should be apparent to those skilled in the art that the examples of the present disclosure can be practiced without, or with variation of, these specific details. Therefore, these descriptions shall be considered to be illustrative instead of restrictive thereto. Therefore, these descriptions shall be considered to be illustrative instead of restrictive thereto.

While the present disclosure has been described in conjunction with specific examples thereof, many alternatives, modifications and variations of such examples will be apparent to those of ordinary skill in the art in light of the foregoing description. For example, other memory architectures, such as dynamic RAM (DRAM), may use the examples discussed.

The examples of the disclosure are intended to embrace all such alternatives, modifications, and variations as to fall within the broad scope of the appended claims. Therefore, any omission, modification, equivalent replacement and improvement made within the spirits and principles of the examples of the present disclosure shall fall within the protection scope of the present disclosure.

What is claimed is:

1. An arithmetic encoding and decoding method of images based on a semantic source, applied to an encoder, comprising:
   obtaining a preset encoding interval of the semantic source and a syntax symbol sequence to be encoded; wherein, the syntax symbol sequence to be encoded contains at least one syntax symbol;
   for each syntax symbol, determining a preset target synonymous subset corresponding to the syntax symbol; wherein, the target synonymous subset is a subset of preset symbol information corresponding to same semantic information;
   encoding the target synonymous subset corresponding to each syntax symbol according to the preset encoding interval through an arithmetic encoding algorithm to obtain an encoded result sequence corresponding to the syntax symbol sequence to be encoded; and
   obtaining a sequence length of the syntax symbol sequence to be encoded and sending the sequence length and the encoded result sequence to a decoder for decoding the encoded result sequence based on the sequence length to obtain a reconstructed syntax symbol sequence;
   wherein determining a preset target synonymous subset corresponding to the syntax symbol comprises:
   obtaining target symbol information of the syntax symbol; and selecting an initial synonymous subset corresponding to the target symbol information from preset initial synonymous subsets associated with the syntax symbol as the target synonymous subset corresponding to the syntax symbol;
   wherein a construction process of the preset initial synonymous subsets comprises:
   for each syntax symbol, determining multiple pieces of preset symbol information corresponding to the syntax symbol and semantic information corresponding to each piece of preset symbol information; and
   dividing the multiple pieces of preset symbol information into at least one initial synonymous subset based on the semantic information corresponding to each piece of preset symbol information; wherein, pieces of preset symbol information corresponding to same semantic information are divided into a same initial synonymous set; and the multiple pieces of the preset symbol information comprise the target symbol information.

2. The method according to claim 1, wherein, encoding the target synonymous subset corresponding to each syntax symbol according to the preset encoding interval through an arithmetic encoding algorithm to obtain an encoded result sequence corresponding to the syntax symbol sequence to be encoded comprises:
   for each syntax symbol, determining a probability of an initial synonymous subset associated with the syntax symbol by adding probabilities of the multiple pieces of the preset symbol information corresponding to the initial synonymous subset;
   obtaining a first permutation order of the syntax symbols in the syntax symbol sequence to be encoded and selecting a target encoding interval from the preset encoding interval based on the first permutation order, the target synonymous subsets corresponding to the syntax symbols and probabilities of the initial synonymous subsets associated with each syntax symbol through the arithmetic encoding algorithm; and
   determining a shortest binary sequence according to the target encoding interval and taking the shortest binary sequence as the encoded result sequence corresponding to the syntax symbol sequence to be encoded.

3. The method according to claim 2, wherein, selecting a target encoding interval from the preset encoding interval based on the first permutation order, the target synonymous subsets corresponding to the syntax symbols and probabilities of the initial synonymous subsets associated with each syntax symbol through an arithmetic encoding algorithm comprises:
   taking the preset encoding interval as a candidate encoding interval, taking a first syntax symbol in the syntax symbol sequence according to the first permutation order as a target symbol, and performing at least one iteration operation on the preset encoding interval; wherein, each iteration operation comprises:
   dividing the candidate encoding interval into at least one initial encoding interval corresponding to the initial synonymous subsets of the target symbol based on the probabilities of the initial synonymous subsets of the target symbol;
   taking the initial encoding interval that corresponds to the target synonymous subset of the target symbol as an updated candidate encoding interval and taking a next syntax symbol of the target symbol according to the first permutation order as an updated target symbol for a next iteration;
   exiting the iteration operation, if there is no next symbol in the syntax symbol sequence; and
   taking the candidate encoding interval as the target encoding interval after executing at least one iteration operation.

4. The method according to claim 1, wherein, before encoding the target synonymous subset corresponding to each syntax symbol according to the preset encoding interval through an arithmetic encoding algorithm, the method further comprises:
   determining whether the syntax symbol sequence satisfies a first preset condition; wherein, the first preset condition comprises: multiple pieces of the preset symbol information corresponding to any two syntax symbols in the syntax symbol sequence to be encoded are the same, the initial synonymous subsets corresponding to the two syntax symbols are the same, and the probabilities of the initial synonymous subsets corresponding to the two syntax symbols are the same;
   in response to determining that the syntax symbol sequence satisfies the first preset condition, encoding the target synonymous subset corresponding to each syntax symbol according to the preset encoding interval through an arithmetic encoding algorithm comprises:
   constructing a sequence of target synonymous subsets based on the target synonymous subset of each syntax symbol; and
   encoding the target synonymous subset sequence based on the preset encoding interval through the arithmetic encoding algorithm to obtain the encoded result sequence corresponding to the syntax symbol sequence.

5. An arithmetic coding and decoding method of images based on a semantic source, applied to a decoder, comprising:

receiving a sequence length and an encoded result sequence sent by an encoder and obtaining a preset decoding interval and preset syntax symbols of the semantic source;

decoding the encoded result sequence to obtain at least one reconstructed synonymous subset based on the preset decoding interval through an arithmetic decoding algorithm; wherein, the number of the at least one reconstructed synonymous subset equals to the sequence length; each of the at least one reconstructed synonymous subset is a subset of preset symbol information corresponding to same semantic information;

for each reconstructed synonymous subset, determining semantic information corresponding to the reconstructed synonymous subset and selecting a target reconstructed syntax symbol corresponding to the reconstructed synonymous subset from the preset syntax symbols based on the semantic information; and arranging the target reconstructed syntax symbols corresponding to the reconstructed synonymous subsets to obtain a sequence of reconstructed syntax symbols;

wherein decoding the encoded result sequence to obtain at least one reconstructed synonymous subset based on the preset decoding interval through an arithmetic decoding algorithm comprises:

transforming the encoded result sequence into a target codeword;

constructing a reconstructed symbol sequence based on the sequence length; wherein, the number of symbols in the reconstructed symbol sequence equals to the sequence length;

determining a second permutation order of symbols in the reconstructed symbol sequence;

for each symbol in the reconstructed symbol sequence, obtaining at least one initial reconstructed synonymous subset corresponding to the symbol and a probability of each initial reconstructed synonymous subset;

determining a target decoding interval corresponding to each symbol in the preset decoding interval based on the second permutation order, the probability of each initial reconstructed synonymous subset corresponding to each symbol and the target codeword through the arithmetic decoding algorithm; and for each symbol, determining a reconstructed synonymous subset based on the target decoding interval and initial reconstructed synonymous subsets.

6. The method according to claim 5, wherein, determining a target decoding interval corresponding to each symbol in the preset decoding interval based on the second permutation order, the probability of each initial reconstructed synonymous subset corresponding to each symbol and the target codeword through an arithmetic decoding algorithm comprises:

taking the preset decoding interval as a candidate decoding interval, taking a first symbol in the reconstructed symbol sequence according to the second permutation order as a target symbol, and performing at least one iteration operation in the preset decoding interval; wherein, each iteration operation comprises:

dividing the candidate decoding interval into at least one initial decoding interval based on a probability of each initial reconstructed synonymous subset corresponding to the target symbol;

wherein, each initial decoding interval has a one-to-one corresponding relationship with the probability of an initial reconstructed synonymous subset;

selecting an initial decoding interval containing the target codeword from the at least one initial decoding interval as the target decoding interval corresponding to the target symbol, taking the target decoding interval as an updated candidate decoding interval and taking a next symbol of the target symbol according to the second permutation order as an updated target symbol for a next iteration;

exiting the iteration operation, if there is no next symbol in the reconstructed symbol sequence according to the second permutation order; and obtaining the target decoding interval corresponding to each symbol.

7. The method according to claim 5, wherein, before decoding the encoded result sequence to obtain at least one reconstructed synonymous subset based on the preset decoding interval through an arithmetic decoding algorithm, the method further comprises:

determining whether the preset syntax symbols satisfy a second preset condition; wherein, the second preset condition comprises: multiple pieces of preset symbol information of any two preset syntax symbols are the same, the division methods of the initial synonymous subsets corresponding to the two preset syntax symbols are the same, and the probabilities of the initial synonymous subsets corresponding to the two preset syntax symbols are the same;

in response to determining that the preset syntax symbols satisfy the second preset condition, decoding the encoded result sequence to obtain at least one reconstructed synonymous subset based on the preset decoding interval through an arithmetic decoding algorithm comprises:

decoding the encoded result sequence according to the preset decoding interval through the arithmetic decoding algorithm to obtain a reconstructed synonymous subset sequence; wherein, the reconstructed synonymous subset sequence contains multiple reconstructed synonymous subsets.

8. An electronic device, comprising a memory, a processor, and a computer program stored in the memory and executable on the processor, wherein the processor executes the computer program to implement the arithmetic coding and decoding method based on the semantic source according to claim 1.

\* \* \* \* \*